J. PARRINO.
VEHICLE TIRE.
APPLICATION FILED OCT. 8, 1919.
1,371,186.
Patented Mar. 8, 1921.
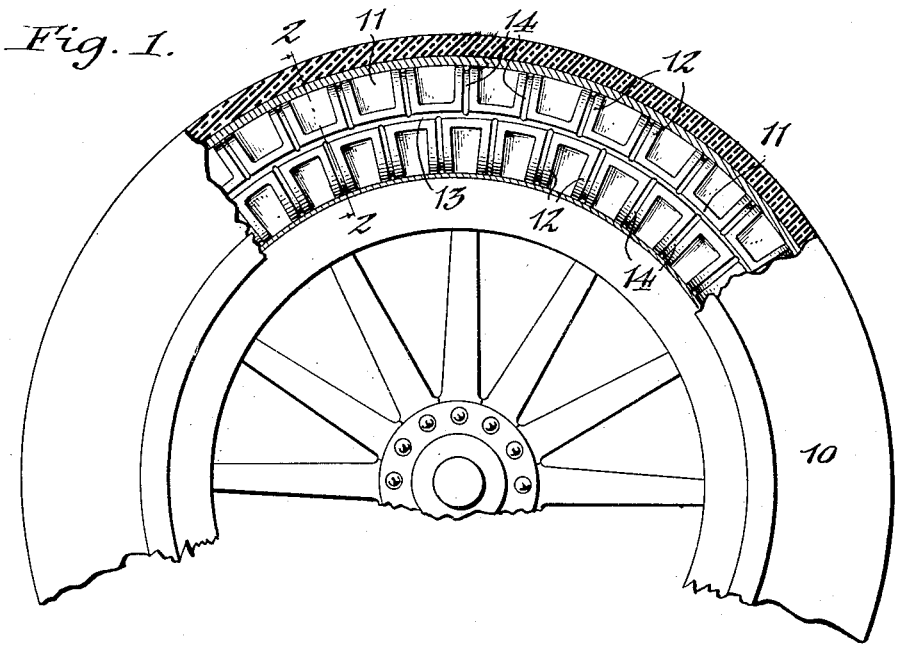
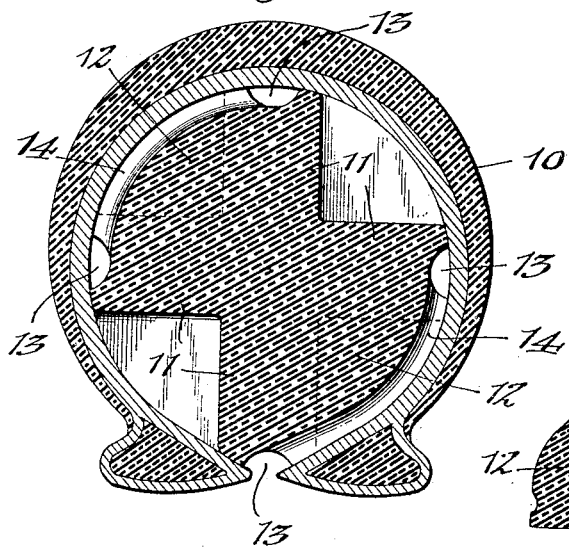
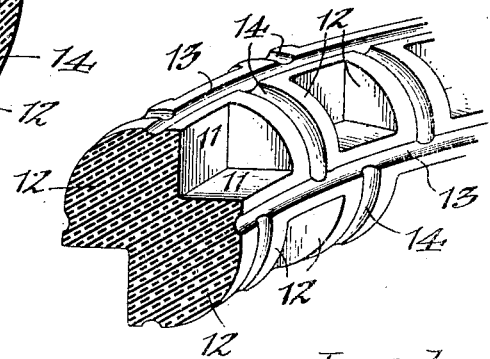
Inventor,
Joseph Parrino,
by Geyer & Popp
Attorneys.

UNITED STATES PATENT OFFICE.

JOSEPH PARRINO, OF BUFFALO, NEW YORK, ASSIGNOR OF ONE-HALF TO GUISEPPE DI GIROLAMO, OF BUFFALO, NEW YORK.

VEHICLE-TIRE.

1,371,186.

Specification of Letters Patent. Patented Mar. 8, 1921.

Application filed October 8, 1919. Serial No. 329,264.

*To all whom it may concern:*

Be it known that I, JOSEPH PARRINO, a citizen of the United States, residing at Buffalo, in the county of Erie and State of New York, have invented new and useful Improvements in Vehicle-Tires, of which the following is a specification.

This invention relates to the class of non-puncturable cushion tires which are provided with a resilient core or filler in lieu of the usual air-tube.

Its object is the improvement of the filler with a view of equally distending and supporting the tire casing on all sides and distributing the load and strains as nearly as possible over all parts thereof, in order to cause the tire to run smoothly as well as increase its durability.

A further object is the construction of a filler of this character which combines lightness with a high degree of resilience.

In the accompanying drawings:

Figure 1 is a fragmentary side elevation, partly in section, of a vehicle wheel equipped with the improvement. Fig. 2 is an enlarged cross section of the tire, on line 2—2, Fig. 1. Fig. 3 is a fragmentary perspective view of the filler.

Similar characters of reference indicate corresponding parts in the several views.

10 indicates the customary shoe or casing of the tire which forms no part of my invention and may be of ordinary construction.

The core or filler is of substantially cruci-form cross section with its radial wings or flanges 11 extending continuously throughout the circumference of the tire. Two of these flanges are disposed radially of the wheel to distend and support the tire casing at the central portion of its tread, while the other two extend laterally from the body of the filler to distend the side portions of the casing. Arranged between adjacent flanges of the filler are transverse webs, blocks or partitions 12 suitably spaced to distend and support those portions of the tire casing between the several flanges 11. The edges of these partitions are curved to conform to the inner side of the casing, and in their preferred arrangement the partitions of one longitudinal series are staggered with relation to those of the adjacent series; or in other words, the partitions of one sector of the filler are arranged opposite the spaces between the partitions of the adjoining sectors, and diagonally opposite partitions are in alinement with each other transversely of the filler.

By this construction and arrangement, a comparatively light and highly-resilient filler is produced which properly supports the tread and side portions of the tire-casing uniformly throughout its circumference, this distributing the load and strains equally over the casing and increasing the durability of the tire as a whole. The partitions are arranged sufficiently close together to give the casing the necessary support at the tread to cause it to run smoothly or without objectionable vibration.

If desired, the filler may be further reduced in weight by providing its flanges with longitudinal grooves 13 in their faces, and forming similar grooves 14 in the curved outer edges of the partitions. This construction also renders the filler more resilient.

The entire filler may be molded in a single piece of rubber or other suitable material having the necessary resilience.

I claim as my invention:

A resilient filler for tire casings, comprising a body portion of cruci-form cross section, the four oppositely-extending longitudinal flanges of the filler being continuous and two of said flanges projecting laterally in opposite directions to distend the side walls of the tire casing, while the other two flanges are arranged radially in line with each other and extend in opposite directions from the center of the filler to distend and support the tread portion of the tire casing, and spaced transverse webs bridging adjacent flanges, the outer edges of said flanges and said webs being curved to conform to the internal contour of the tire-casing, and the webs of one sector of the filler being located opposite the spaces between the webs of adjacent sectors.

JOSEPH PARRINO.